(12) United States Patent
Gorski et al.

(10) Patent No.: US 7,207,741 B2
(45) Date of Patent: Apr. 24, 2007

(54) BUSHING SYSTEM FOR POWER TRANSMISSION PRODUCTS

(75) Inventors: Paul Thomas Gorski, Duncan, SC (US); Donald L. Nisley, Greenville, SC (US); James E. Mickelson, Simpsonville, SC (US); Roman M. Wajda, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 269 days.

(21) Appl. No.: 10/955,296

(22) Filed: Sep. 30, 2004

(65) Prior Publication Data

US 2006/0067786 A1    Mar. 30, 2006

(51) Int. Cl.
*B25G 3/20* (2006.01)
*F16B 2/00* (2006.01)
*F16B 7/04* (2006.01)

(52) U.S. Cl. ............... 403/373; 403/374.2; 403/374.3; 403/374.4; 29/426.1; 29/428; 29/525.01; 29/525.11

(58) Field of Classification Search ............... 403/373, 403/374.1, 374.2, 374.4, 367, 372, 371; 464/79, 464/80, 87, 88, 92; 29/426.1, 469, 426.5, 29/428, 525.01, 525.11
See application file for complete search history.

(56) References Cited

U.S. PATENT DOCUMENTS

| | | | |
|---|---|---|---|
| 738,445 A | 9/1903 | Hoffmann | 384/540 |
| 851,419 A | 4/1907 | Hess | 384/538 |
| 1,561,443 A | 11/1925 | Searles | 384/542 |
| 2,519,927 A | 8/1950 | Pedu, Jr. | 301/5.7 |
| 2,584,740 A | 2/1952 | Reynolds | 403/350 |
| 2,728,616 A | 12/1955 | Potter | 384/484 |
| 2,740,676 A | 4/1956 | Potter | 384/537 |
| 3,020,737 A * | 2/1962 | Firth | 464/80 |
| 3,036,872 A | 5/1962 | King, Jr. et al. | 384/537 |
| 3,239,292 A | 3/1966 | Howe, Jr. et al. | 384/541 |
| 3,521,342 A | 7/1970 | Van Dorn et al. | 29/898.067 |

(Continued)

FOREIGN PATENT DOCUMENTS

DE        4107864        9/1992

(Continued)

OTHER PUBLICATIONS

Rockwell Automation Introduces New Dodge® Grip Tight™ Adapter Ball Bearing, Greenville, SC, Dec. 11, 2002.

*Primary Examiner*—Daniel P. Stodola
*Assistant Examiner*—Nahid Amiri
(74) *Attorney, Agent, or Firm*—Thompson Coburn LLP (57) ABSTRACT

A system is provided for securing two ends of a rotating member, such as a shaft, with respect to a non-rotating member, such as a mounting hub. Inner and outer sleeves have tapered surfaces and are positioned about the rotating member and provided within a bore of the non-rotating member. The tapered surfaces of the inner and outer sleeves cooperate in securing the shaft within the bore. The one or more inner sleeves collectively provide two threaded extensions for engagement with two nuts. Further, the one or more outer sleeves aggregately include two extensions, each having an annular groove to accommodate a lip formed in the nut. The system is engaged and disengaged through the interaction of the various tapered surfaces and the nuts, caused by the directional rotation of the nuts.

32 Claims, 5 Drawing Sheets

U.S. PATENT DOCUMENTS

| | | | | |
|---|---|---|---|---|
| 4,164,063 A | | 8/1979 | Cenko et al. | 419/28 |
| 5,011,306 A | | 4/1991 | Martinie | 384/585 |
| 5,135,269 A | * | 8/1992 | Babuder | 285/328 |
| 5,489,156 A | | 2/1996 | Martinie | 384/538 |
| 5,564,982 A | * | 10/1996 | Gipson et al. | 464/88 |
| 5,665,908 A | * | 9/1997 | Burkey et al. | 73/146.8 |
| 5,685,650 A | | 11/1997 | Martinie et al. | 384/538 |
| 5,709,483 A | | 1/1998 | Martinie | 384/538 |
| 5,897,214 A | | 4/1999 | Nisley | 384/537 |
| 6,167,900 B1 | * | 1/2001 | Laird | 137/227 |
| 2006/0068923 A1 | * | 3/2006 | Nisley | 464/88 |

FOREIGN PATENT DOCUMENTS

| | | |
|---|---|---|
| JP | 05026247 | 2/1993 |
| RU | 1810630 A1 | 4/1993 |

* cited by examiner

BUSHING SYSTEM FOR POWER TRANSMISSION PRODUCTS

BACKGROUND

The invention relates generally to the field of rotating machinery. More particularly, the present techniques regard arrangements for securing a shaft or similar rotating member in a relatively long, hollow support member, such as a long bore outer hub assembly or mounting hub.

A wide range of rotating machinery is known and currently in use in a variety of industrial, commercial, and other applications. In many such applications shafts (or inner hubs) are supported for rotation within hollow members, such as outer or mounting hubs, and other mechanical supports. The shaft may be driven in rotation by a prime mover, such as an electric motor or engine, or may be linked to various power transmission elements such as chain drives, belt drives, transmissions, pulleys, and so forth. In all such applications mounting structures are typically required to support the rotating and non-rotating members with respect to one another in a manner sufficient to resist loading, while still allowing the rotating members to rotate freely.

When mounting rotating elements within a long bore, such as that found in certain outer or mounting hubs, several key considerations generally come into play. For example, the hub, any bearings supporting the hub in rotation, and any other associated coupling or mounting structures must be capable of withstanding the anticipated loads of the application. Moreover, the mounting structures should allow for the desired balancing or centering of loads within or about the bearing assemblies and hub configurations. In the case of a relatively long hub, such as in some gear reducer or pulley applications, it may be desirable to couple a single shaft (or some other rotating member) to each end of the hub to adequately support the shaft in rotation. Also, the mounting arrangement should prevent premature wear or fretting of the shaft and mounting components, thus maximizing the operating life of these devices. The arrangements should also permit use of hollow members having non-tapered (i.e., cylindrical) inner diameters or bores, if desired, to permit use, for example, of lower-cost and standard off-the-shelf outer and mounting hubs. Finally, the mounting structures would ideally be relatively straightforward in application, permitting the shaft (or inner hub) or outer hub configurations to be installed without undue expense, both in terms of time and parts. The latter concern extends to dismounting or disassembling the various components for faster servicing and replacement when necessary, resulting in less downtime and higher productivity.

Mounting structures have been developed that address these concerns adequately, although further improvement is necessary. For example, various tapered locking structures have been developed that force tapered members between a shaft and a mounting hub or bearing. A wide range of structures have been developed for forcing one or more tapered sleeves, for example, into engagement between a hollow member and a shaft. Such structures provide good mechanical support and allow for tight engagement of the hollow member and shaft. However, disassembly of such structures is often problematic, sometimes resulting in damage or destruction of mechanical components of the system, such as a shaft or tapered sleeve, for example. In certain known arrangements the mounting components are also relatively expensive to manufacture and can be difficult to assemble and disassemble.

There is a need, therefore, for an improved system for mounting a shaft or similar mechanical component within a hollow member. There is a particular need for a straightforward and reliable system for mounting rotating elements, such as shafts, within long bore hub configurations.

BRIEF DESCRIPTION

The present invention provides a novel technique for supporting two ends of a rotating member with respect to a non-rotating member designed to respond to such needs. While the system is described herein as applied to a hollow member in which a shaft is mounted, the invention extends to mounting of shafts, hubs, and other mechanical elements as well. Similarly, the invention is particularly well suited to mounting of shafts, hubs and other rotating elements within mounting hub configurations. However, the invention might find application in the mounting of stationary members centrally, with a bearing or other rotating or non-rotating element about the central member.

In one embodiment, the system employs a tapered locking arrangement in which tapered surfaces of an inner sleeve having two tapered ends and two tapered outer sleeves interface with each other to allow the sleeves to enter into tight engagement with each other, a rotating member, and a non-rotating member. The tapered outer surface of each end of the inner sleeve mounts against a tapered inner surface of an outer sleeve. Two locking members or nuts are secured on threaded portions of the inner sleeve, and each locking member comprises an internal groove and lip configuration for cooperation with a complimentary surface of a respective outer sleeve. For assembly, the nuts are rotationally advanced inwardly to draw the components into tight engagement. For disassembly, the nut is rotated in the opposite direction to force the sleeves out of engagement, freeing the components.

In another embodiment, the system employs an alternative tapered locking arrangement in which tapered surfaces of an outer sleeve having two tapered ends, and two tapered inner sleeves interface with each other to allow the sleeves to enter into tight engagement with each other, a rotating member, and a non-rotating member. The tapered outer surface of each inner sleeve mounts against a tapered inner surface of a respective end of the outer sleeve. Two locking members or nuts are secured on threaded portions of the two inner sleeves, and each locking member comprises an internal groove and lip configuration for cooperation with a complimentary surface of a respective end of the outer sleeve. For assembly, the nuts are rotationally advanced inwardly to draw the components into tight engagement. For disassembly, the nut is rotated in the opposite direction to force the sleeves out of engagement, freeing the components.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
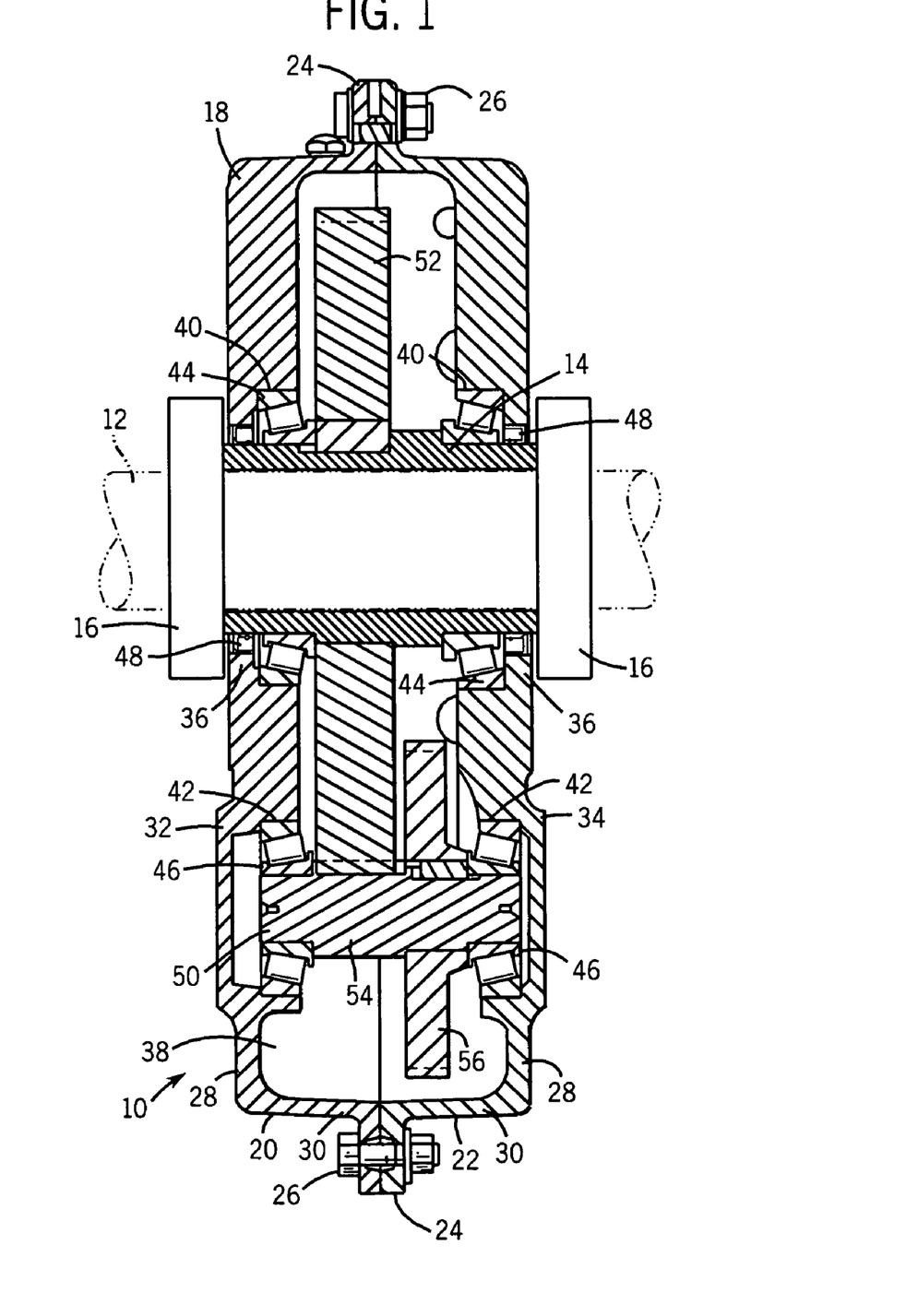
FIG. 1 is a sectional view of a gear reducer having a shaft mounted within the gear reducer in accordance with the present techniques.

Turning now to the drawings, and referring first to FIG. 1, a cross-section of a two-stage gear reducer, represented generally by the reference numeral 10, is illustrated. The presently illustrated cross-section of gear reducer 10 includes a rotating assembly comprising a shaft 12, which may be an output shaft driven in a final application, supported within a hub 14. The gear reducer also includes a number of other rotating assemblies, including one or more intermediate assemblies and an input assembly (not shown).

It should be noted that while reference may be made in the present description to input and output shafts and hubs, aspects of the present invention are not intended to be limited to any particular input or output configuration. In particular, input can be made into the gear reducer via an input hub configuration, or a shaft, with output from the gear reducer being made through a hub as illustrated, or via an output shaft. Similarly, while reference is made herein to a gear reducer, the machinery described herein may be employed for increasing speeds, where desired, or simply for transmitting rotary power without changes in speed.

In the illustrated embodiment, a nut 16 assists in coupling each end of shaft 12 to hub 14 of the present system. While coupling a single end of a shaft to a hub may be adequate in certain applications, in the case of a long bore hub, such as hub 14, it is preferable to couple both ends of the shaft, such as shaft 12, to the hub distribute the load on the shaft more evenly and to reduce possible vibration of the shaft within the bore. Again, any suitable arrangements may be made for coupling the input and output components to other machinery, including keyed shafts and hubs, splined shafts and hubs, and so forth.

Gear reducer 10 includes a housing 18 for supporting at least the output rotating assembly associated with shaft 12 and hub 14 and an input rotating assembly (not shown), as well as other rotating assemblies used to transmit torque between these components. As illustrated in FIG. 1, housing 18 includes a front housing half or shell 20, and a rear housing half or shell 22. For ease of manufacture, the housing shells may be configured as identical structures, such that initial blanks or castings for the shells may be machined and assembled to form both the front and back shells. In the present embodiment, the front and rear shells of housing 18 each are surrounded by a partial or complete peripheral flange 24 for facilitating assembly of the gear reducer. In particular, the shells are secured to one another with the rotating assemblies positioned therein, via a series of fastener sets 26 extending through the peripheral flanges. Machine mounting flanges, support structures, and so forth (not shown) may include apertures which also receive certain of the fastener sets extending through the peripheral flanges of the gear reducer to support the gear reducer in given applications. Additionally, front housing shell 20 and rear housing shell 22 each include a generally planar wall 28 formed integrally with a peripheral wall 30. Walls 28 and 30 of each housing shell, when assembled in the product, enclose an internal cavity 38 in which the gearing, bearings, and other components of the gear reducer may be positioned.

Each shell 20 and 22 of housing 18 includes a series of support structures integrally formed therein for mechanically supporting rotating assemblies. As discussed above, these assemblies may include output hub 14, as well as additional input or output assemblies, and intermediate rotating assemblies for transmitting torque in multiple stages. As may be seen in the present sectional view, both front and rear housing shells 20 and 22 comprise an output rotating assembly support 36 to support hub 14 in rotation. Shells 20 and 22 also comprise rotating assembly supports 32 and 34, respectively, to support an intermediate rotating assembly. Though not shown in the present illustration, similar supports are also formed in the housing shells for an input rotating assembly, and may be formed for supporting additional intermediate rotating assemblies as well. Again, the designations as input or output supports should not be interpreted as limiting the applicability of the various support locations. Input or output rotating structures may be provided at any one of the supports.

At each rotating assembly support location, the housing shells are provided with support structures which can be machined to receive a support bearing assembly for the rotating assembly. In particular, as shown in FIG. 1, supports 36, which support hub 14 in rotation, each include a bearing support 40 machined within enlarged regions or ribs integrally formed in the casting or blank from which the housing shells are machined. Similar bearing supports 42 are formed in rotating assembly supports 32 and 34 of front housing shell 20 and rear housing shell 22, respectively, to support an intermediate rotating assembly.

Within bearing supports 40, bearing assemblies 44 are provided for supporting hub 14 in rotation. Additionally, at each location where hub 14 extends through the housing, one or more seal assemblies 48 may be provided for retaining lubricant within the gear reducer housing and preventing the ingress of contaminants and fluids from outside the housing. Similarly, bearing sets 46 are provided in bearing supports 42 of front housing shell 20 and rear housing shell 22 for supporting an intermediate rotating assembly, comprising a shaft 50. It should be noted, that while identically sized and rated bearing sets may be provided on either side of each rotating assembly, depending upon anticipated loading, bearing sets of different sizes or ratings may be provided. Similarly, the bearing supports formed in each support structure may be machined to different dimensions (e.g., diameters and depths) to accommodate the bearing set to be supported therein.

Each rotating assembly of the gear reducer, supported at a corresponding support location, will generally include a rotating support member, such as a shaft or hub, and gearing, such as a pinion or gear wheel affixed to the shaft or hub. In the embodiment illustrated in FIG. 1, an output gear 52 is secured to hub 14 for rotation therewith, intermeshing with a pinion section 54 of shaft 50 to either receive torque from, or transmit torque to, shaft 50. Pinion section 54, in the illustrated embodiment, is formed integrally with shaft 50 adjacent to the location of gear 56 in the assembled product. Gear 56 may similarly transmit torque to, or receive torque from, other gearing elements (not shown) of the gear reducer.

Figure 2:
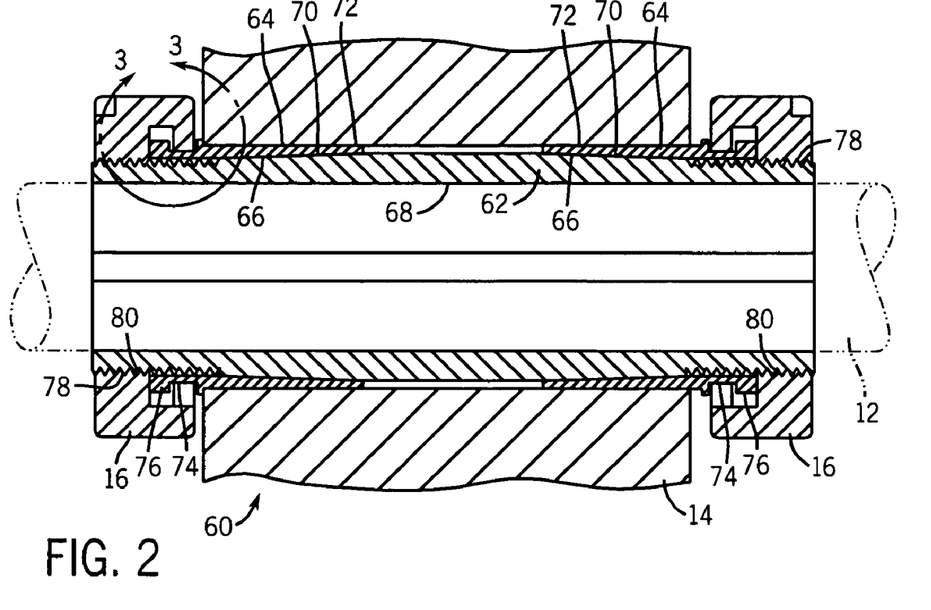
FIG. 2 is a partial sectional view of the gear reducer of FIG. 1, illustrating an exemplary embodiment of a shaft mounting system in accordance with the present techniques.

An exemplary mounting system 60 for coupling a mechanical member within a long bore of a hollow member is illustrated in FIG. 2. As shown in FIG. 2, in the exemplary embodiment illustrated, the system is applied to couple shaft 12 to hub 14, to allow torque transmission between these two elements. Though the hollow member in the present illustration is hub 14, the hollow member may in practice be any of a number of different structures, such as a mounting hub, fan hub, sheave hub, bearing assembly, and so forth, secured on a shaft 12. Many such applications may exist, for example, in rotating machinery and power transmission, as well as in non-rotating applications. In this example, hub 14 supports shaft 12 in rotation. Moreover, while a shaft is shown and described herein, various types of mechanical elements may be employed with the present system, such as inner hubs, various support extensions, gearing, pinions, and so forth. Also, as will be appreciated by those skilled in the art, while hub 14 is shown housed within gear reducer 10 (see FIG. 1), hub 14 (or another hollow member) may be mounted within one of a variety of housing styles depending upon the mechanical configuration of the application, the anticipated loading, and so forth. The particular configurations of the hollow member, such as hub 14, facilitate its operation and interfacing with mounting structures.

System 60 employs an inner sleeve 62 and two outer sleeves 64 positioned about shaft 12 and within the bore of hub 14 to couple the shaft to the hub. Each of the inner and outer sleeves illustrated comprises a tapered surface and a non-tapered surface. Specifically, inner sleeve 62 comprises a tapered outer surface 66 on each of the two ends of the inner sleeve, and a non-tapered inner surface 68 that is adapted to interface with an inner mechanical member, such as shaft 12. Conversely, each outer sleeve 64 comprises a tapered inner surface 70, which is configured to interface with one of the tapered surfaces of the inner sleeve, and a non-tapered outer surface 72 that is adapted for interfacing with an interior surface of a hollow member, such as hub 14. Inner sleeve 62 may be fitted within outer sleeves 64, which, in turn, may be fitted within a bore of hub 14 or within some other hollow member. As discussed below, the cooperation between these sleeves may allow use of hollow members having straight cylindrical bores, which are less expensive and more readily available than specially profiled bores. Though the present embodiment utilizes outer sleeves 64 comprising non-tapered outer surfaces 72 for mounting a shaft within a straight cylindrical bore, the outer sleeves may, if desired, instead be formed with tapered outer surfaces to accommodate mounting within a tapered bore configuration.

Referring again to FIG. 2, each outer sleeve 64 comprises an extension having an annular groove 74 and first concentric lip 76, which interface with a nut 16 as discussed in greater detail below. Similarly, each end of inner sleeve 62 comprises a threaded extension 78, to interface with a complimentarily threaded inner surface 80 of a nut 16. As each nut 16 is rotated and tightened to lock the assembly, the respective outer sleeve advances into the bore of the hollow member, drawing the tapered surfaces of the inner and outer sleeve into tighter engagement. This, in turn, causes outer surfaces 72 of outer sleeves 64 to tightly engage the inner surface of the hollow member (hub 14 of the present illustration), while also causing inner surface 68 of inner sleeve 62 to firmly engage an interior mechanical member, such as shaft 12. The interfacing of nuts 16 with the sleeves allows securing of the shaft and the hub to one another, while permitting straightforward assembly and disassembly of the system with minimal strain and unwanted loading to the shaft, the hub, and associated components.

Figure 3:
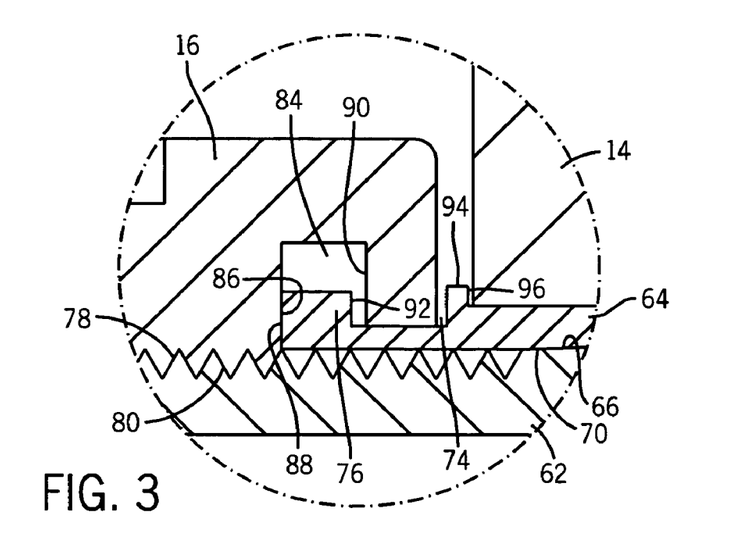
FIG. 3 is a detailed representation of various interfacing surfaces of a nut, inner sleeve, and outer sleeve taken generally along line 3—3 of FIG. 2.

The interaction between a nut 16, inner sleeve 62, and an outer sleeve 64 may be described in greater detail with respect to the illustration of FIG. 3. As described above, the presently illustrated end of inner sleeve 62 includes tapered outer surface 66 and threaded extension 78 (which complements threaded inner surface 80 of nut 16), while outer sleeve 64 comprises tapered inner surface 70 and annular groove 74, positioned adjacent to lip 76. As shown in the present figure, nut 16 comprises an internal groove 84, an abutment face 86, and an inner surface 90 of the lip formed by groove 84. As nut 16 is rotated to advance the nut toward the hub during assembly of the system, abutment face 86 of the nut bears against a distal face 88 of outer sleeve 64 to drive the outer sleeve into tight engagement between inner sleeve 62 and hub 14. In an alternative embodiment, an exterior surface of the lip formed on the nut may engage a corresponding surface of the outer sleeve, such as a lip 94. However, in the present embodiment, full engagement of the distal face of the outer sleeve and the abutment face of the nut is preferred to propel the outer sleeve into tight engagement with the inner sleeve and the hub. Further, lip 94 includes a stop face 96 prevents excessive penetration of outer sleeve 82 into hub 14.

Disassembly of the tapered sleeve from the inner ring is effected by rotation of the nut in a direction causing the nut to move away from the hub. In the detail view illustrated in FIG. 3, inner surface 90 of the varying depth lip formed on the nut bears against an inner surface 92 of lip 76 of the outer sleeve. Although the two surfaces do not engage fully over 360°, it has been found that excellent force distribution can be obtained to cause release of the outer sleeve from the shaft and inner sleeve. Again, the nut remains centered by engagement on threaded extension 78 of the sleeve. Following the initial release of the outer sleeve from the hub, the system can be fully disassembled by disengagement of the nut from the inner sleeve, and removal of the inner sleeve, the outer sleeve, the shaft, and the hub from one another.

Figure 4:
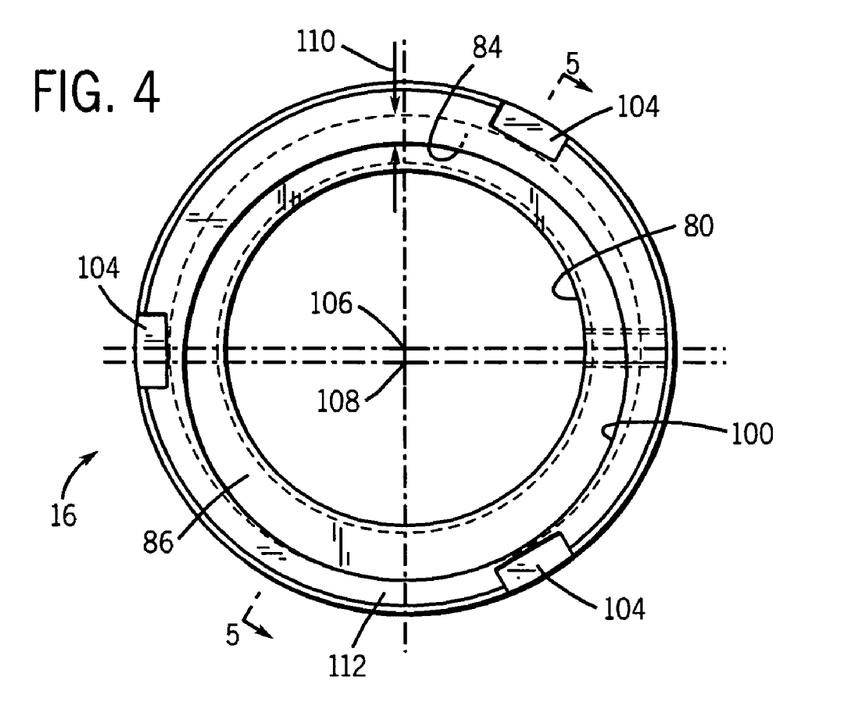
FIG. 4 is an elevational view of a locking member or nut as used in the system of FIGS. 1 and 2, illustrating the eccentric aperture and varying depth groove used for mounting and operating the nut for engagement and disengagement of the system.
Figure 5:
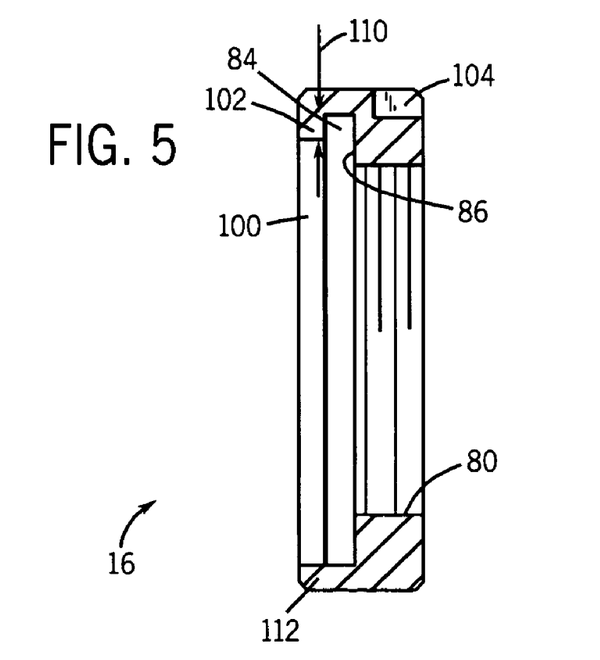
FIG. 5 is a side sectional view of the nut as shown in FIG. 4, illustrating various surfaces and features of the nut.

Certain features of nut 16 are best illustrated in, and described with respect to, FIGS. 4 and 5. As discussed above, each nut 16 has a threaded inner surface 80 designed to be engaged on a threaded extension 78 of inner sleeve 62. Further, an aperture 100 is formed eccentrically on a front face of nut 16. The aperture forms an opening larger than the outer diameter of lip 76 of outer sleeve 64, such that the nut may be slipped onto the lip during assembly. An internal groove 84 is formed within nut 16 so as to form a radially inwardly projecting lip 102 between the internal groove and eccentric aperture 100. Groove 84 is concentric with respect to the general configuration of the nut, and particularly with respect to threaded inner surface 80. Owing to the concentricity of groove 84 and the eccentricity of aperture 100, lip 102, like groove 84, has a depth which varies circumferentially around the nut. Groove 84 is bounded on a side opposite lip 102 by an abutment face 86 (see FIG. 3).

Finally, tool recesses 104 or similar structures are preferably provided to permit engagement of a tool (not shown) for tightening and loosening the nut in the assembly.

Threaded inner surface 80 of nut 16, and groove 84, share a central axis 106 which is generally the rotational axis of nut 16. Eccentric aperture 100, on the other hand, has an axis 108 which is displaced from axis 106 so as to form the groove and lip of varying depth. In the illustrated embodiment, groove 84 and lip 102 have a depth which varies from a maximum depth 110 to a minimal depth 112 at a point diametrically opposed to depth 110. At the point of minimum depth 112, groove 84 is substantially flush with eccentric aperture 100. Various other configurations can, of course, be provided at which the minimum depth does not vary down to the point at which the groove and aperture are flush with one another.

As noted above, and referring again to FIG. 2, the illustrated configuration of nut 16 permits the nut to be installed on an outer sleeve 64 and engaged on a threaded extension 78 of inner sleeve 62. In particular, because eccentric aperture 100 is larger in dimension than lip 76 of the outer sleeve, with the shaft, the inner sleeve, and the outer sleeve positioned loosely with respect to one another, the nut can be placed over lip 76 and centered on the inner sleeve. The nut may then be used to tighten or loosen engagement between the inner and outer sleeves, as well as engagement of these sleeves with the shaft and hollow member, in the fashion previously described. Once positioned in the desired manner, a set screw (not shown) within the nut may be utilized to prevent further rotation of the nut on a threaded extension of the inner sleeve.

Figure 6:
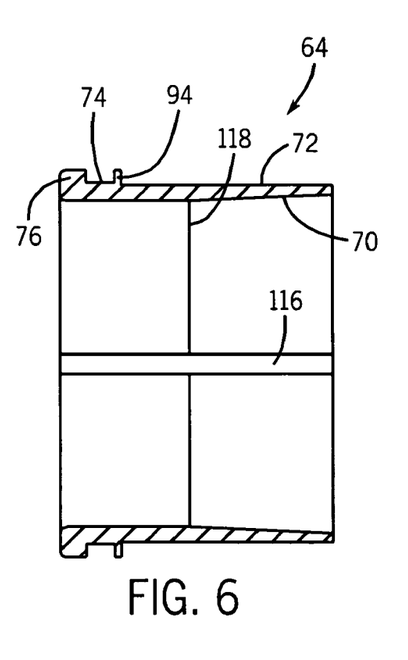
FIG. 6 is a sectional view of the tapered outer sleeve of FIG. 2, illustrating various surfaces and features of the tapered outer sleeve.

Further details of the inner and outer sleeves of system 60 are described below with respect to FIGS. 6 and 7. In the illustrated example of FIG. 6, one or more slits 116 may extend through an outer sleeve 64 to permit expansion or contraction of the outer sleeve during tightening or loosening within the assembly. The outer annular groove 74, which is bounded by the first lip 76, is formed on the wider end of outer sleeve 64. In addition, a second lip 94 is also formed on the wider end of the outer sleeve, which prevents excessive movement of the outer sleeve into a hollow member, as discussed above with respect to FIG. 3. Also shown in FIG. 6 is a taper starting point 118 of an exemplary outer sleeve 64. In the present illustration, the tapering of tapered inner surface 70 of the outer sleeve begins at this point 118 and extends to an end of the outer sleeve opposite lip 76. As discussed above, outer surface 72 of the outer sleeve 64 engages the inner surface of hub 14 (see FIG. 2).

Figure 7:
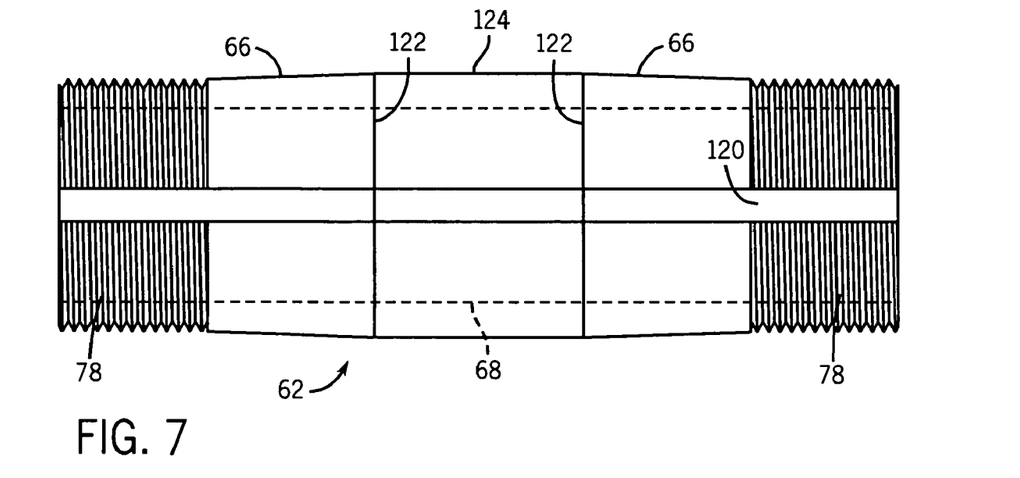
FIG. 7 depicts the tapered inner sleeve illustrated in the mounting system of FIG. 2, showing various surfaces and features of the tapered inner sleeve.

Tapered inner sleeve 62 of mounting system 60 is illustrated in greater detail in FIG. 7. Inner surface 68 of the inner sleeve has a configuration designed to interface with the shaft in application, such as a generally right cylindrical shape in the embodiment shown in FIG. 2. As discussed, each end of the inner sleeve includes an externally threaded extension 78, adapted to engage the threaded inner surface of a nut 16, and a tapered outer surface 66, configured to interface with an outer sleeve. Similar to the outer sleeve of FIG. 6, inner sleeve 62 may include one or more slits 120 that extend through the inner sleeve to permit expansion or contraction of the inner sleeve during tightening or loosening within the assembly.

In exemplary inner sleeve 62, the taper of each end of the inner sleeve is defined by a taper point 122, in which the tapering of the exterior surface of the inner sleeve begins at point 122 and continues outwardly to some point proximate to threaded extension 78. The outer surface of inner sleeve 62 may also be characterized by a generally cylindrical portion 124 of the outer surface extending between a pair of taper start points 122. The length of this cylindrical portion 124 of the outer surface is defined by the distance between taper points 122. Thus, as would be understood by those skilled in the art, though illustrated in the present embodiment, this cylindrical portion 124 would not be present in the case of a single taper point defining the starting point of the tapering of the outer surface of both ends of the inner sleeve. It should also be noted that the inner and outer sleeves described herein may include various additional features not specifically illustrated in the figures. For example, the sleeves may include additional slits adapted to accommodate keys, splines, or other mechanical features used to secure the various elements with respect to one another and to permit transmission of torque in application.

Figure 8:
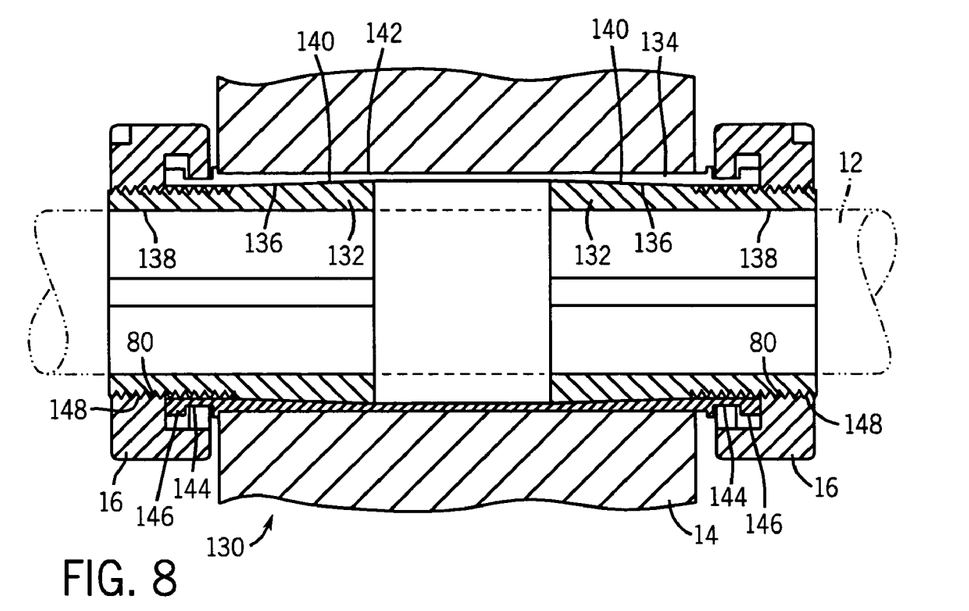
FIG. 8 illustrates an alternative exemplary embodiment of a shaft mounting system in accordance with the present techniques.

An alternative exemplary mounting system 130 for coupling a shaft, or some other mechanical member, within a long bore of a hollow member is illustrated in FIG. 8. Similar to the embodiment described above with respect to FIG. 2, the present embodiment is also shown for coupling shaft 12 to hub 14. Again, the depiction of shaft 12 and hub 14 are merely by way of example; the present techniques are not limited to coupling a shaft to a hub. Various mechanical members, such as inner hubs and support extensions, for example, may be coupled to any number of hollow members, such as a hub or gearing, in accordance with these techniques.

System 130 comprises two inner sleeves 132 and an outer sleeve 134 useful in coupling shaft 12 to hub 14. Each inner sleeve 132 comprises a tapered outer surface 136 and a non-tapered inner surface 138 configured to interface with shaft 12. In turn, outer sleeve 134 comprises a non-tapered outer surface 142, for interfacing with an interior surface of hub 14, while each end of the outer sleeve comprises a tapered inner surface 140, which is configured to interface with a tapered surface 136 of an inner sleeve 132. The shaft is positioned within the inner sleeves, which are configured to fit within the outer sleeve as shown. The inner and outer sleeves are positioned within the bore of hub 14 or some other hollow member. As in the previous embodiment discussed above, the cooperation between these sleeves allows the use of less expensive and more commonly available straight cylindrically bored hollow members, although outer sleeve 134 may be modified to have a tapered outer surface to instead accommodate a hollow member having a tapered bore.

Each end of outer sleeve 134 also comprises an extension having an annular groove 144 and first concentric lip 146, which interface with a nut 16 as discussed above with respect to FIGS. 2–6. A threaded extension 148 of each inner sleeve 132 interfaces with a complimentarily threaded inner surface 80 of a nut 16. As each nut 16 is rotated and tightened to lock the assembly, the respective inner sleeve is drawn outwardly from the center of the hollow member, drawing the tapered surfaces of the inner and outer sleeves into tighter engagement. This cooperation between the tapered surfaces causes outer surface 142 of outer sleeve 134 to tightly engage the inner surface of hub 14, while also causing inner surfaces 138 of inner sleeves 132 to firmly engage shaft 12. Conversely, as each nut 16 is loosened, the respective inner sleeve is driven inwardly, loosening the engagement between the tapered surfaces of the inner and outer sleeves, thereby uncoupling shaft 12 from hub 14. As in the previously described mounting system, the interfacing of nut 16 with the sleeves allows securing of the shaft and the hub to one another, while permitting straightforward assembly and disassembly of the system with minimal strain and unwanted loading to the shaft, the hub, and associated components.

Figure 9:
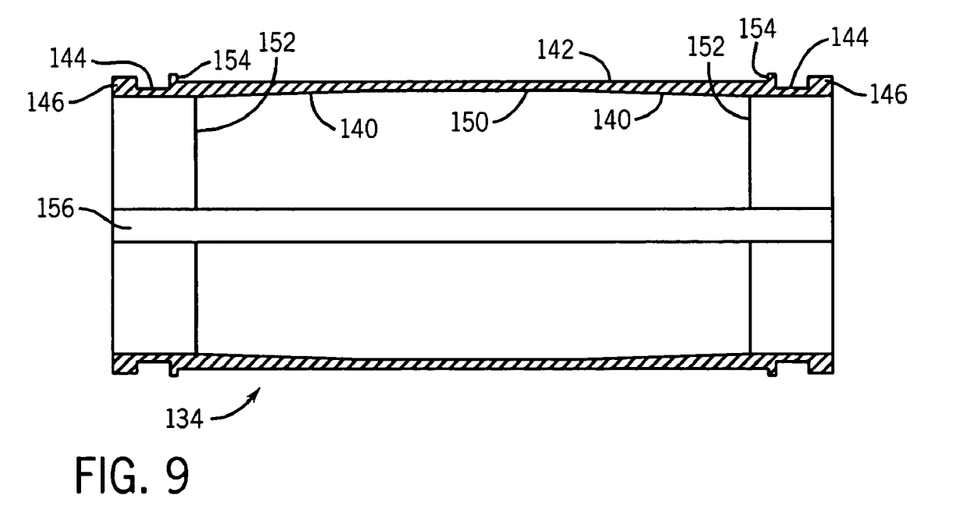
FIG. 9 is a sectional view of the tapered outer sleeve as shown in FIG. 8, illustrating various surfaces and features of the tapered outer sleeve.
Figure 10:
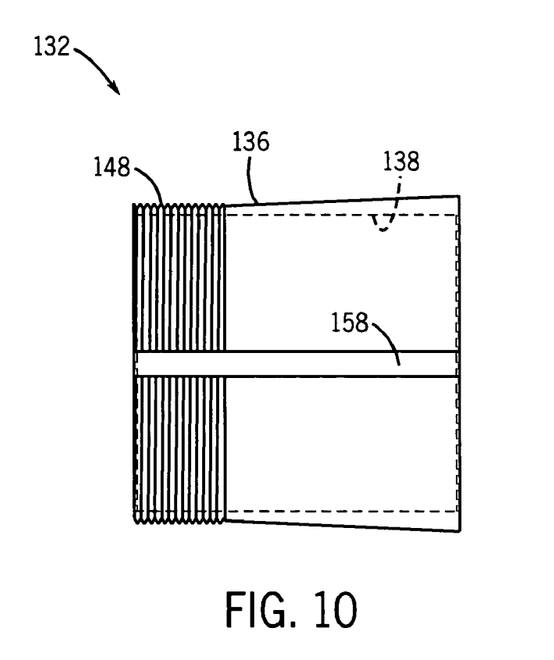
FIG. 10 illustrates a tapered inner sleeve depicted in the mounting system of FIG. 8, showing various surfaces and features of the tapered inner sleeve.

The inner and outer sleeves of system 130 are described more particularly with reference to FIGS. 9 and 10. In the case of exemplary outer sleeve 134 of FIG. 9, outer surface 142 interfaces with an inner surface of hub 14 (see FIG. 8), while each end of the outer sleeve comprises an outer annular groove 144, bounded by a first lip 146 and a second lip 154. The second lip is adapted to prevent excessive movement of the outer sleeve into a hollow member, such as hub 14. Also shown in the present figure are taper starting points 152 of outer sleeve 134. Moving inward from the ends of the outer sleeve, the tapering of tapered inner surface 140 of each end of the outer sleeve originates at a point 152 of each respective end and the tapering terminates at some point further inward. Depending upon the length of tapered surfaces 140, the outer sleeve may also comprise a generally cylindrical portion 150 of the inner surface of the outer sleeve. Additionally, one or more slits 156 may extend through the outer sleeve to permit expansion or contraction of the outer sleeve during tightening or loosening of the mounting assembly.

Turning now to FIG. 10, an exemplary tapered inner sleeve 132 of mounting system 130 is illustrated in greater detail. Inner surface 138 of the inner sleeve has a configuration designed to interface with a shaft in application, such as a generally right cylindrical shape. As previously discussed, the inner sleeve includes an externally threaded extension 148, configured to engage the threaded inner surface of nut 16, and a tapered outer surface 136, configured to interface with outer sleeve 134. In this present embodiment, the tapered surface corresponds to a widening of the outer diameter of the sleeve from a minimum diameter at the threaded extension, to a maximum diameter at an end opposite the threaded extension. Slits 158 that extend through the inner sleeve to permit expansion or contraction of the inner sleeve during tightening or loosening within the assembly may also be provided. As mentioned above with respect to FIGS. 6 and 7, the inner and outer sleeves described in FIGS. 9 and 10 may include various additional features, such as additional slits to accommodate keys or splines, not specifically illustrated in the figures.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for securing a shaft within a hollow member, comprising:
    an outer sleeve comprising an outer surface configured to mount against an inner surface of a hollow member and first and second ends, wherein each of the first and second ends of the outer sleeve comprises a tapered inner surface, a generally cylindrical extension, and a concentric lip formed on the extension;
    first and second inner sleeves, each inner sleeve comprising a tapered outer surface configured to interface with the tapered inner surface of a respective one of the first and second ends of the outer sleeve, an inner surface configured to interface with a shaft, and a threaded extension;
    a first locking member comprising a threaded inner section configured to mate with the threaded extension of the first inner sleeve, and an eccentric aperture forming a varying depth inner groove configured to mate with the concentric lip of the first end of the outer sleeve; and
    a second locking member comprising a threaded inner section configured to mate with the threaded extension of the second inner sleeve, and an eccentric aperture forming a varying depth inner groove configured to mate with the concentric lip of the second end of the outer sleeve.

2. The system of claim 1, further comprising the hollow member.

3. The system of claim 1, wherein the hollow member comprises a mounting hub.

4. The system of claim 1, wherein the concentric lip of each of the first and second ends of the outer sleeve is defined by an annular groove formed within the extension of the respective first and second ends of the outer sleeve.

5. The system of claim 4, wherein the first locking member abuts a distal face of the first end of the outer sleeve for engagement with the threaded extension of the first inner sleeve for drawing the first inner sleeve into engagement with the first end of the outer sleeve between the hollow member and the shaft.

6. The system of claim 5, wherein a lateral wall of the inner groove of the first locking member abuts the lip of the first end of the outer sleeve to urge the first end of the outer sleeve out of engagement with the first inner sleeve and the hollow member.

7. The system of claim 1, wherein the eccentric aperture of the first locking member is of larger diameter than an outer diameter of the lip of the first end of the outer sleeve.

8. The system of claim 7, wherein the groove formed by the eccentric aperture of the first locking member varies in depth from a maximal depth to substantially flush with the central aperture.

9. The system of claim 1, comprising a further lip on the first end of the outer sleeve that inhibits movement of the first locking member into contact with the hollow member.

10. A system for assembly and disassembly of an outer member and shaft, the system comprising:
    a shaft;
    an outer member configured for mounting about the shaft;
    an outer sleeve having first and second ends, each of the first and second ends having a tapered inner surface, a cylindrical extension, and an annular outer groove forming a lip on the extension;
    first and second inner sleeves configured for assembly between the shaft and the outer sleeve, each inner sleeve comprising a tapered outer surface to interface with the tapered inner surface of a respective one of the first and second ends of the outer sleeve, an inner surface to interface with the shaft, and an externally threaded extension;
    a first nut having a threaded inner surface for interfacing with the threaded extension of the first inner sleeve, and an eccentric aperture forming an inner groove of varying depth for interfacing with the lip of the first end of the outer sleeve; and
    a second nut having a threaded inner surface for interfacing with the threaded extension of the second inner sleeve, and an eccentric aperture forming an inner groove of varying depth for interfacing with the lip of the second end of the outer sleeve.

11. The system of claim 10, wherein the inner groove of the first nut forms a lip of varying depth.

12. The system of claim 11, wherein the lip of the first nut and the annular outer groove of the first end of the outer sleeve are dimensioned to permit a distal face of the first end of the outer sleeve to abut the first nut during threaded engagement of the first nut and the first inner sleeve for drawing the first inner sleeve between the first end of the outer sleeve and the shaft.

13. The system of claim 12, wherein the inner groove of the second nut forms a lip of varying depth.

14. The system of claim 13, wherein the lip of the second nut and the annular outer groove of the second outer sleeve are dimensioned to permit a distal face of the second outer sleeve to abut the second nut during threaded engagement of the second nut and the second end of the inner sleeve for drawing the second inner sleeve between the second end of the outer sleeve and the shaft.

15. The system of claim 10, wherein a lateral wall of the inner groove of the first nut abuts the lip of the first outer sleeve to urge the first inner sleeve out of engagement with the first end of the outer sleeve and the shaft.

16. The system of claim 15, wherein a lateral wall of the inner groove of the second nut abuts the lip of the second outer sleeve to urge the second inner sleeve out of engagement with the second end of the outer sleeve and the shaft.

17. The system of claim 10, wherein the eccentric aperture of the first nut is of larger diameter than an outer diameter of the lip of the first end of the outer sleeve.

18. The system of claim 17, wherein the inner groove of the first nut varies in depth from a maximal depth to substantially flush with the central aperture.

19. The system of claim 18, wherein the eccentric aperture of the second nut is of larger diameter than an outer diameter of the lip of the second end of the outer sleeve.

20. The system of claim 19, wherein the inner groove of the first nut varies in depth from a maximal depth to substantially flush with the central aperture.

21. The system of claim 10, wherein the first nut is centered with respect to the first end of the outer sleeve by threaded engagement with the first end of the inner sleeve.

22. The system of claim 21, wherein the second nut is centered with respect to the second end of the outer sleeve by threaded engagement with the second end of the inner sleeve.

23. A method for assembling a hollow member and a shaft, the method comprising:
assembling an outer sleeve and a first and second inner sleeve between the hollow member and the shaft, the outer sleeve having first and second ends, each of the first and second ends comprising a tapered inner surface and a cylindrical extension presenting an annular outer groove forming a concentric lip, the first and second inner sleeves each comprising a tapered outer surface to interface with the tapered inner surface of the respective first and second ends of the outer sleeve, an inner surface to interface with the shaft, and an externally threaded extension;
assembling a first locking member on the first inner sleeve, the first locking member including an inner threaded section to interface with the threaded extension of the first inner sleeve, and an eccentric aperture forming a varying depth groove for receiving the lip of the first end of the outer sleeve;
assembling a second locking member on the second inner sleeve, the second locking member including an inner threaded section to interface with the threaded extension of the second inner sleeve, and an eccentric aperture forming a varying depth groove for receiving the lip of the second end of the outer sleeve; and
tightening the first and second locking members on the first and second inner sleeves, respectively, to draw the outer sleeve and the first and second inner sleeves into engagement between the hollow member and the shaft.

24. The method of claim 23, wherein the eccentric aperture of the first locking member is of larger diameter than the lip of the first end of the outer sleeve.

25. The method of claim 24, wherein the eccentric aperture of the second locking member is of larger diameter than the lip of the second end of the outer sleeve.

26. The method of claim 23, comprising the further step of tightening a set screw in the first or second locking member to prevent loosening of the respective locking member.

27. The method of claim 23, wherein as the first locking member is tightened on the first inner sleeve, the first locking member abuts a further lip of the first end of the outer sleeve for drawing the first inner sleeve between the first end of the outer sleeve and the shaft.

28. The method of claim 23, wherein as the first locking member is tightened on the first inner sleeve, a body portion of the first locking member abuts a distal face of the first end of the outer sleeve for drawing the first inner sleeve between the first end of the outer sleeve and the shaft.

29. A method for disassembling an outer member and a shaft, the method comprising:
rotating a first locking member on a tapered first inner sleeve positioned between a tapered first end of an outer sleeve and a shaft, the first end of the outer sleeve having a tapered inner surface and a cylindrical extension presenting an annular groove, the first inner sleeve having a threaded extension and a tapered outer surface interfacing with the tapered inner surface of the first end of the outer sleeve, the first locking member having a threaded inner section engaging the threaded outer surface of the first inner sleeve, and an eccentric aperture forming a varying depth groove, a side wall of the varying depth groove contacting a side wall of the annular groove of the first end of the outer sleeve to force relative displacement of the first end of the outer sleeve and the first inner sleeve; and
rotating a second locking member on a tapered second inner sleeve positioned between a tapered second end of an outer sleeve and a shaft, the second end of the outer sleeve having a tapered inner surface and a cylindrical extension presenting an annular groove, the second inner sleeve having a threaded extension and a tapered outer surface interfacing with the tapered inner surface of the second end of the outer sleeve, the second locking member having a threaded inner section engaging the threaded outer surface of the second inner sleeve, and an eccentric aperture forming a varying depth groove, a side wall of the varying depth groove contacting a side wall of the annular groove of the second end of the outer sleeve to force relative displacement of the second end of the outer sleeve and the second inner sleeve.

30. The method of claim 29, wherein the varying depth groove of the first locking member has a depth varying from a maximal depth to substantially flush with the eccentric aperture.

31. The method of claim 30, wherein the varying depth groove of the second locking member has a depth varying from a maximal depth to substantially flush with the eccentric aperture.

32. The method of claim 29, further comprising loosening a set screw in the first or second locking member prior to rotating the respective first or second locking member on the tapered sleeve.

* * * * *